United States Patent
Carlson et al.

(10) Patent No.: US 8,139,744 B2
(45) Date of Patent: Mar. 20, 2012

(54) SERVER BASED CONFERENCE CALL VOLUME MANAGEMENT

(75) Inventors: Michael Pierre Carlson, Austin, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/174,763

(22) Filed: Jul. 17, 2008

(65) Prior Publication Data

US 2008/0304645 A1    Dec. 11, 2008

Related U.S. Application Data

(63) Continuation of application No. 10/756,135, filed on Jan. 13, 2004, now Pat. No. 7,522,719.

(51) Int. Cl.
*H04M 3/42* (2006.01)
*H04L 12/16* (2006.01)
*H04Q 11/00* (2006.01)
*G06F 15/16* (2006.01)

(52) U.S. Cl. ............... 379/202.01; 370/260; 709/204
(58) Field of Classification Search ........... 379/202.01; 370/267, 260; 709/204
See application file for complete search history.

(56) References Cited

U.S. PATENT DOCUMENTS

| | | | |
|---|---|---|---|
| 5,020,098 A | 5/1991 | Celli | 379/202 |
| 5,539,741 A * | 7/1996 | Barraclough et al. | 370/267 |
| 5,596,644 A | 1/1997 | Abel et al. | 381/17 |
| 6,125,115 A | 9/2000 | Smits | 370/389 |
| 6,327,567 B1 | 12/2001 | Willehadson et al. | 704/270 |
| 6,337,884 B1 | 1/2002 | Cao et al. | 375/257 |
| 6,522,894 B1 | 2/2003 | Schmidt | 455/552 |

FOREIGN PATENT DOCUMENTS

GB    2 303 516    2/1997

* cited by examiner

*Primary Examiner* — Thjuan K Addy
(74) *Attorney, Agent, or Firm* — Yee & Associates, P.C.; Mark C. Vallone; Rudolf O. Siegesmund

(57) ABSTRACT

A method for automatically adjusting the volume of individual conference call participants during a conference call. The present invention comprises a Configuration Program (CP) and a Volume Adjustment Program (VAP). The CP allows a user to configure the automatic volume adjustment options. The VAP continuously monitors the conference call and adds new participants to a display screen as the new participants are added to the conference call. Based upon the settings that the user selected in the CP, the VAP adjusts the volume of the conference call participant when the new participant is added, adjusts the volume of each conference call participant upon the occurrence of the time interval, or continuously adjusts the volume of each conference call participant. The VAP also allows the user to manually adjust the volume of all of the participants or an individual participant using a plurality of navigation buttons.

24 Claims, 5 Drawing Sheets

SERVER BASED CONFERENCE CALL VOLUME MANAGEMENT

CROSS-REFERENCE TO RELATED APPLICATION(S)

This application is a continuation of U.S. utility patent application entitled "System and Method for Server Based Conference Call Volume Management" filed on Jan. 13, 2004 now U.S. Pat. No. 7,522,719 and accorded Ser. No. 10/756,135 and claims priority therefrom.

FIELD OF THE INVENTION

The present invention is related generally to methods for managing conference calls and specifically to a system and method for changing the volume of an individual participant's voice in a conference call.

BACKGROUND OF THE INVENTION

As companies continue to cut back on travel expenses, conference calls are becoming increasingly important in doing business both within the company and with other companies. One problem associated with conference calls is that not all of the conference call participants speak at the same level. In other words, some participants speak louder than others. The discrepancy between speaking levels of a loud participant and a quiet participant can make it difficult for many of the other participants to understand the speaking participant. Changing the master volume for the conference call is not an acceptable option because the level of discrepancy between a loud participant and a quiet participant remains the same. Thus, in order for the conference call to be at an acceptable volume, the listening party must increase the volume for quiet talkers and decrease the volume for loud talkers. The frequent volume changes are distracting to the listening party. Therefore, a need exists in the art for a method of adjusting the volume level of individual participants.

The prior art has previously addressed problems associated with conference calls. For example, U.S. Pat. No. 6,327,567 (the '567 patent) entitled "Method and System for Providing Audio in Conference Calls" discloses a method for differentiating conference call participants by creating different special orientations between the conference call participants' voices. The invention in the '567 patent modifies the structure of the voice signal of the participants in order to create the different special orientations. However, the invention in the '567 patent still does not solve the problem of reducing the difference in volume levels between loud participants and quiet participants. Therefore, a need still exists for a method and system for automatically adjusting the volume level or a plurality of conference call participants so that the participants' voices are all the same volume level.

SUMMARY OF THE INVENTION

The present invention, which meets the needs stated above, is a method for automatically adjusting the volume of individual conference call participants during a conference call. The software embodiment of the present invention comprises a Configuration Program (CP) and a Volume Adjustment Program (VAP). The CP allows a user to configure the automatic volume adjustment options. The CP allows the user to choose between only adjusting the volume of the conference call participant at the beginning of the call, adjusting the volume of the conference call participant upon the occurrence of a time interval, or continuously adjusting the volume of the conference call participant.

The VAP continuously monitors the conference call and adds new participants to a display screen as the new participants are added to the conference call. Based upon the settings that the user selected in the CP, the VAP adjusts the volume of the conference call participant when the new participant is added, adjusts the volume of each conference call participant upon the occurrence of the time interval, or continuously adjusts the volume of each conference call participant. The VAP also allows the user to manually adjust the volume of all of the participants or an individual participant using a plurality of navigation buttons.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "adjust" shall mean to modify the volume level of a participant.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "conference call" shall mean a telephonic or Internet meeting between a plurality of people.

As used herein, the term "participant" shall mean a person who attends a conference call.

Figure 1:
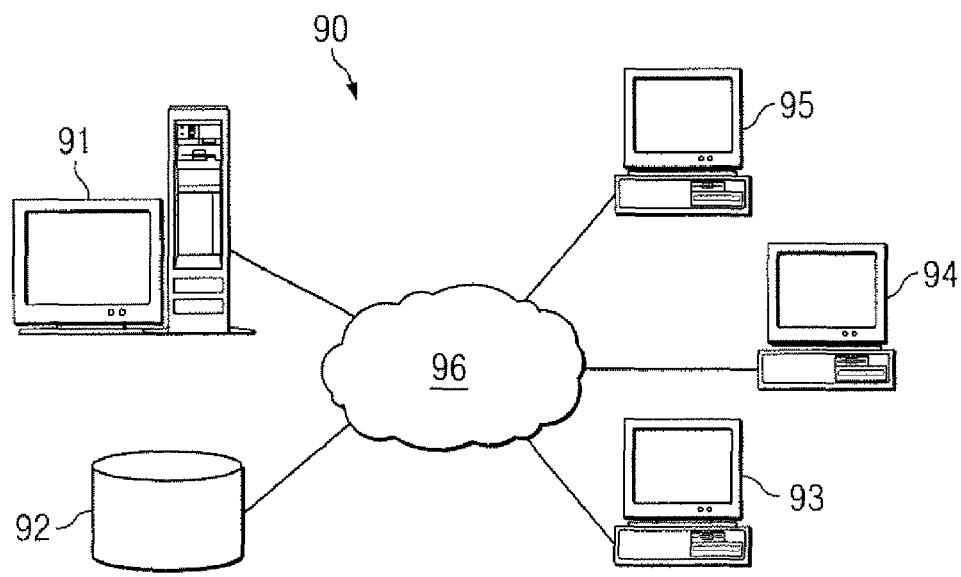
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
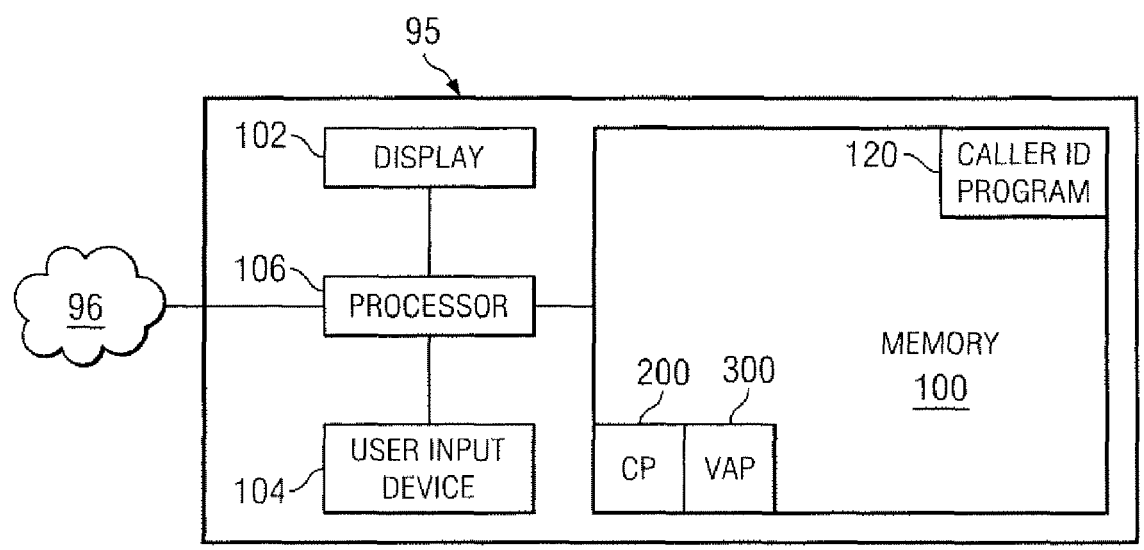
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Configuration Program (CP) 200 and Volume Adjustment Program (VAP) 300. CP 200 and VAP 300 described herein can be stored within the memory of any computer depicted in FIG. 1. Alternatively, CP 200 and/or VAP 300 can be stored in an external storage device such as a removable disk, a CD-ROM, or a USB storage device. Memory 100 is illustrative of the memory within one of the computers of FIG. 1. Memory 100 also contains caller ID program 120. The present invention may interface with caller ID program 120 through memory 100. As part of the present invention, the memory 100 can be configured with CP 200 and/or VAP 300. Processor 106 can execute the instructions contained in CP 200 and/or VAP 300. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 86.

In alternative embodiments, CP 200 and/or VAP 300 can be stored in the memory of other computers. Storing CP 200 and/or VAP 300 in the memory of other computers allows the processor workload to be distributed across a plurality of processors instead of a single processor. Further configurations of CP 200 and/or VAP 300 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program. Caller ID program 120 depicted herein is a program which uses information transmitted over the telephone and/or data lines to identify a participant when the telephone rings. Persons of ordinary skill in the art are aware of how to make a caller ID program such as caller ID program 120 display a participant's name and telephone number on a display device.

The software described herein can be implemented at a conference call center or on the conference call participant's hardware, such as a telephone or a computer. If the present invention is implemented at a conference calling center, then the individual conference participant's volume is adjusted at the conference calling center, and the uniform volume level is sent to each of the conference call participants. If the present invention is implemented on the participants' telephones, then the individual participants' volume level is adjusted by the user's hardware, such as the telephone, box, or computer illustrated in FIGS. 7-9.

Figure 3:
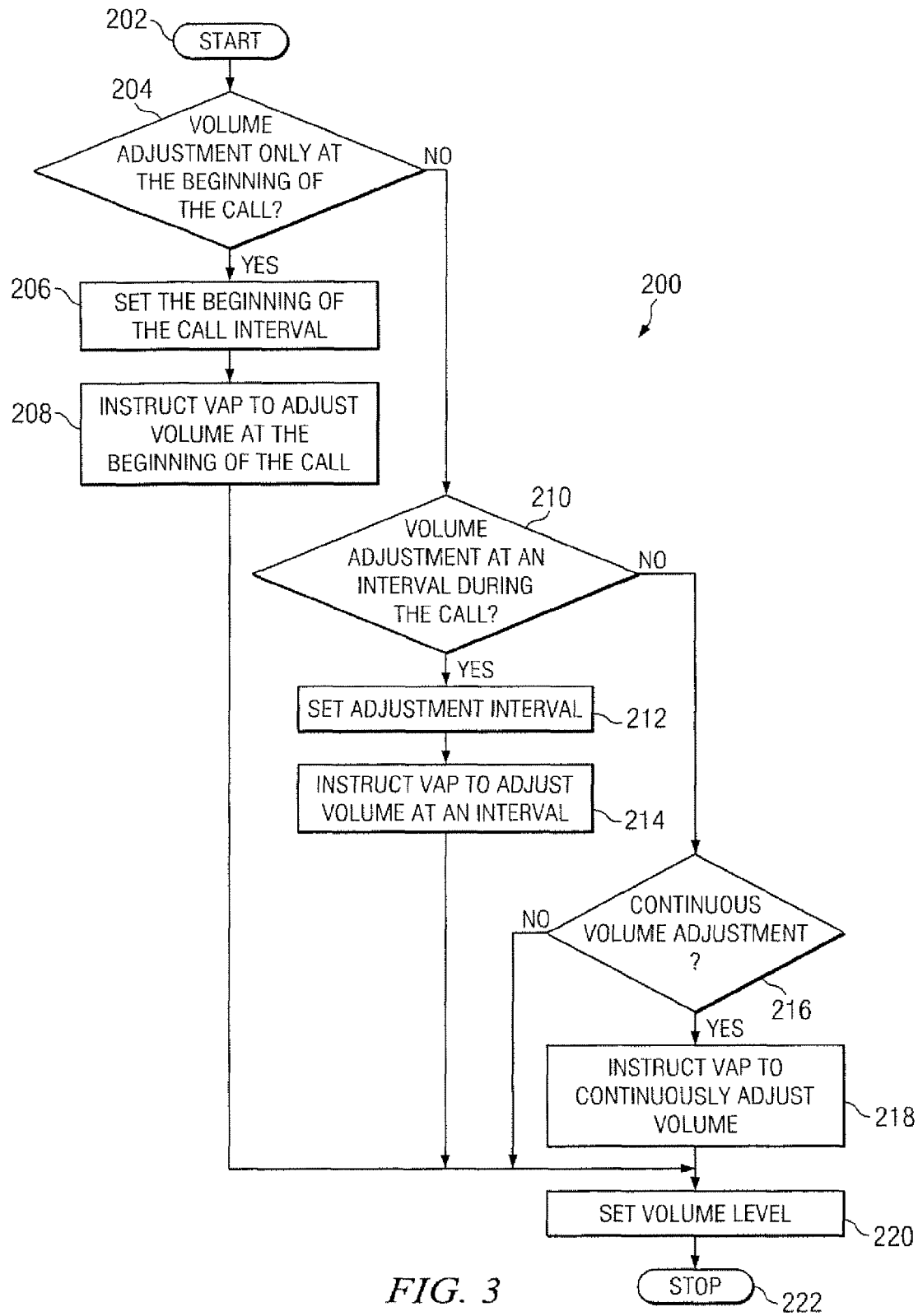
FIG. 3 is an illustration of the logic of the Configuration Program (CP) of the present invention.

FIG. 3 illustrates the logic of Configuration Program (CP) 200 of the present invention. CP 200 is a program that allows the user of the present invention to configure the automated volume adjustment options. CP 200 must be run before Volume Adjustment Program (VAP) 300 can be run. CP 200 starts (202) when invoked by the user. CP 200 then makes a determination whether the user wants the present invention to adjust the conference call participants' volume only at the beginning of a call (204). If the user does not want the present invention to adjust the conference call participants' volume only at the beginning of a call, then CP 200 proceeds to step 210. If the user wants the present invention to adjust the conference call participants' volume only at the beginning of a call, the user sets the interval (i.e. during the first sixty seconds after a new participant connects to the conference call) during which a new participant's volume will be adjusted (206). CP 200 then instructs VAP 300 to adjust the participant's volume only at the beginning of a call (208) and proceeds to step 220.

At step 210, CP 200 determines whether the user wants the present invention to adjust the participants' volume at intervals during the conference call (210). If the user does not want the present invention to adjust the participants' volume at intervals during the conference call, then CP 200 proceeds to step 216. If the user wants the present invention to adjust the participants' volume at intervals during the conference call, then the user enters the adjust interval (i.e. every five minutes during the conference call) (212). CP 200 then instructs VAP 300 adjust the conference call participants' volume at the adjustment interval (214) and proceeds to step 220.

At step 216, CP 200 determines if the user wants the present invention to continuously adjust the conference call participants' volume (216). If the user does not want the present invention to continuously adjust the conference call participants' volume, then CP 200 proceeds to step 220. If the user wants the present invention to continuously adjust the conference call participants' volume, CP 200 instructs VAP 300 to continuously adjust the conference call participants' volume (218), then proceeds to step 220. At step 220, the user selects the desired volume level (220) and CP 200 ends (222). If desired, the present invention may be configured such that the user can change any of the options in CP 200, including the volume setting, during the conference call.

Figure 4:
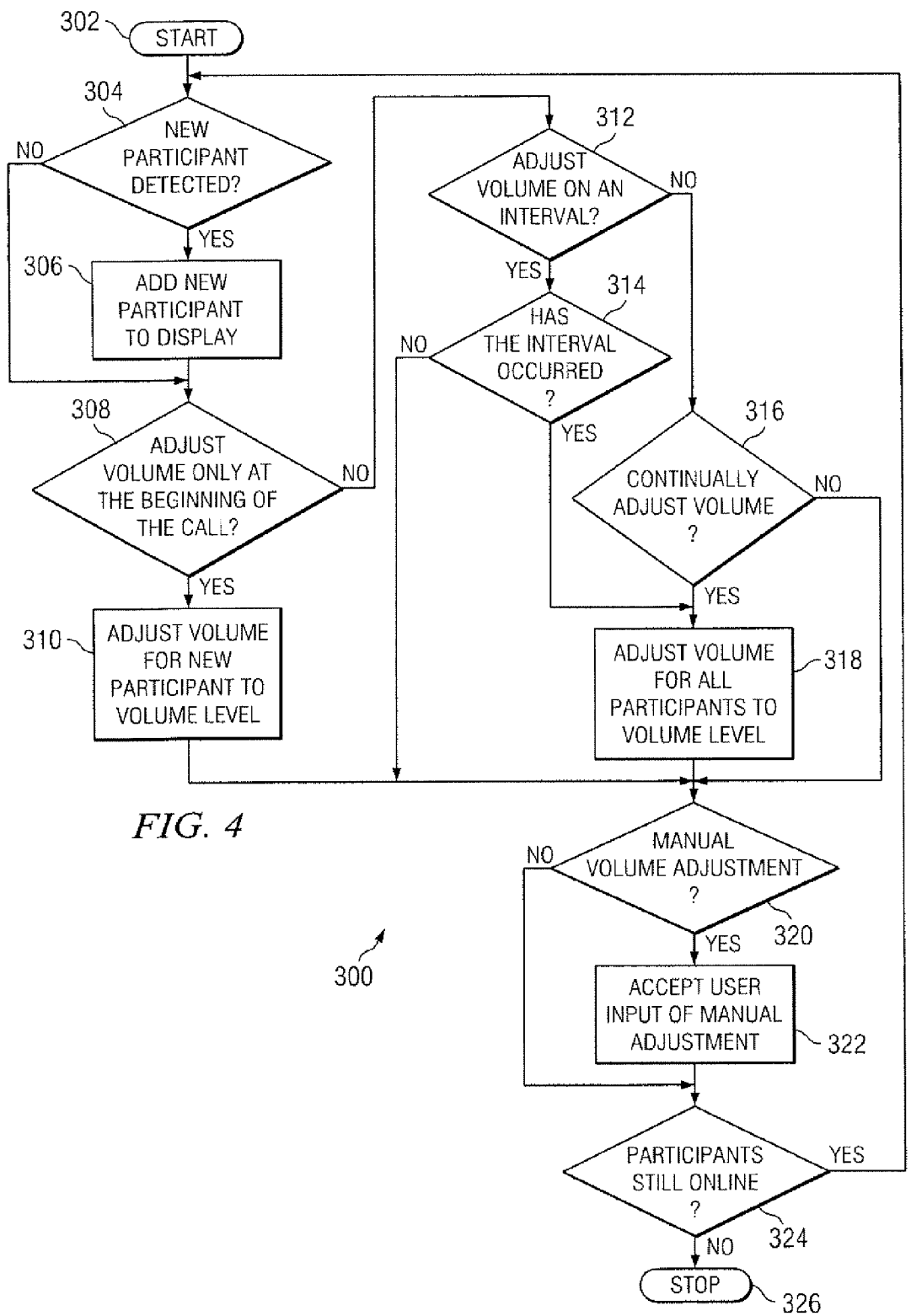
FIG. 4 is an illustration of the logic of the Volume Adjustment Program (VAP) of the present invention.

FIG. 4 illustrates the logic of Volume Adjustment Program (VAP) 300 of the present invention. VAP 300 is a program that adjusts the individual conference call participants' volume during a conference call. Adjusting the individual conference call participant's volume allows the present invention to produce a conference call in which all of the conference call participants speak at the same volume level. VAP 300 starts (302) whenever the user connects to a conference call. VAP 300 then determines whether a new participant is detected (304). A new participant will be detected when the user connects to conference call or a new conference call participant connects to the conference call. If VAP 300 determines that a new participant is not detected, VAP 300 proceeds to step 308. If VAP 300 determines that a new participant is detected, VAP 300 adds the new participant to the display (306) and proceeds to step 308. The display may be like graphical user interfaces (GUIs) depicted in FIGS. 5 and 6.

At step 308, VAP 300 determines whether the user configured the present invention to adjust the volume only at the beginning of the call (308). If the user did not configure the present invention to adjust the volume only at the beginning of the call, VAP 300 proceeds to step 312. If the user configured the present invention to adjust the volume only at the beginning of the call, VAP 300 adjusts the new participant's volume to the user selected volume level (310) and proceeds to step 320.

At step 312, VAP 300 determines whether the user configured the present invention to adjust the volume on an interval (312). If the user did not configure the present invention to adjust the volume on an interval, VAP 300 proceeds to step 316. If the user configured the present invention to adjust the volume on an interval, VAP 300 determines whether the interval has occurred (314). Persons of ordinary skill in the art are aware of how to configure the present invention with a timer to determine whether an interval has occurred. If the interval has not occurred, VAP 300 proceeds to step 320. If the interval has occurred, VAP 300 proceeds to step 318. At step 316, VAP 300 determines whether the user configured the present invention to continuously adjust the conference call participants' volume (316). If the user did not configure the present invention to continuously adjust the conference call participants' volume, then VAP 300 proceeds to step 320. If the user configured the present invention to continuously adjust the conference call participants' volume, VAP 300 adjusts each conference call participants' volume to the user selected volume level (318) and proceeds to step 320.

At step 320, VAP 300 determines whether the user has manually adjusted the volume (320). If the user has not manually adjusted the volume, VAP 300 proceeds to step 324. If the user has manually adjusted the volume, VAP 300 accepts the user input adjusting the volume of an individual conference call participant (322) and proceeds to step 324. Alternatively, the user can adjust the master volume so that the volume of every conference call participant is adjusted the same amount. At step 324, VAP 300 determines whether there are still participants on the line (324). If there are still participants on the line, VAP 300 returns to step 304. If there are no longer any participants on the line, VAP 300 ends (326).

Figure 5:
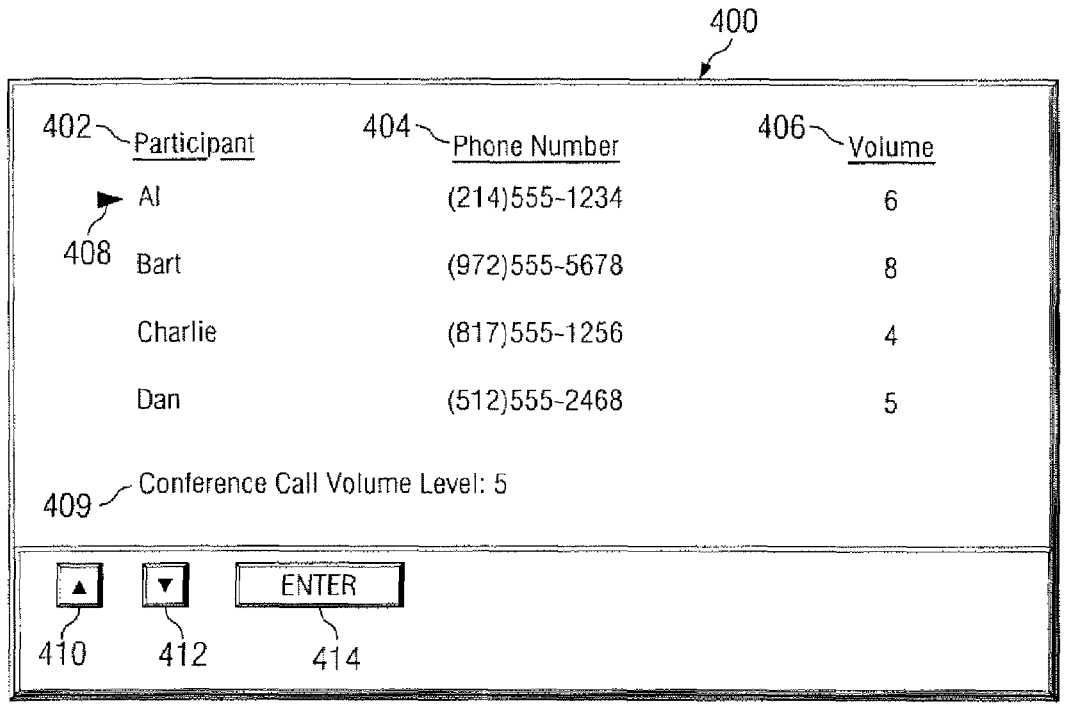
FIG. 5 is an illustration of the graphical user interface (GUI) of the present invention.
Figure 6:
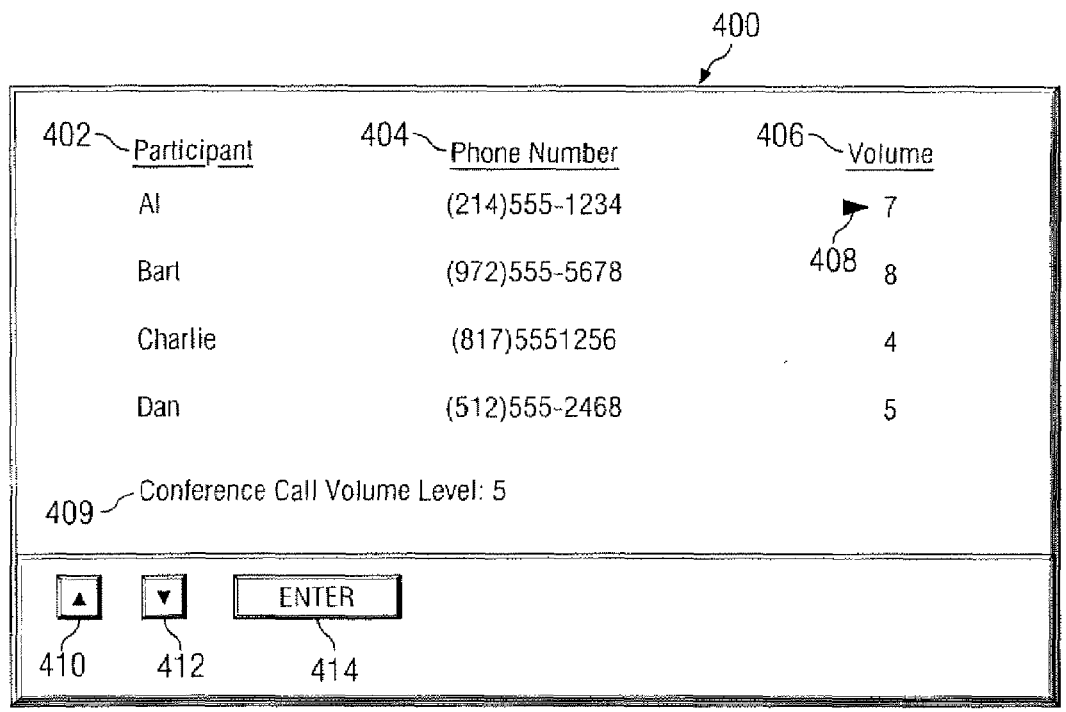
FIG. 6 is an illustration of the GUI of the present invention.

FIGS. 5 and 6 illustrated graphical user interface (GUI) 400 of the present invention. GUI 400 is a display that depicts conference call participants 402, phone numbers 404, volume level 406, and conference call volume level 409. The user may move pointer 408 vertically from one conference call participant 402 to another (See FIG. 5) or to conference call volume level 409 using up button 410 and down button 412. When the user desires to adjust an individual conference call participant's volume level 406 manually, the user selects the conference call participant using enter button 414. Pointer 408 then moves over to volume level 406 (See FIG. 6), where the user can adjust the volume level using up button 410 and down button 412. The user may then press enter button 414 again to move pointer 408 back to conference call participant 402. When the user desires to adjust the master volume manually, the user selects conference call volume level 409 using enter button 414. The user can adjust the volume level using up button 410 and down button 412. Up button 410, down button 412, and enter button 414 may collectively be referred to as navigation buttons.

Figure 7:
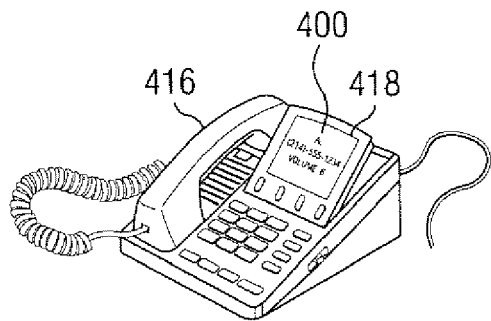
FIG. 7 is an illustration of the present invention telephone.
Figure 8:
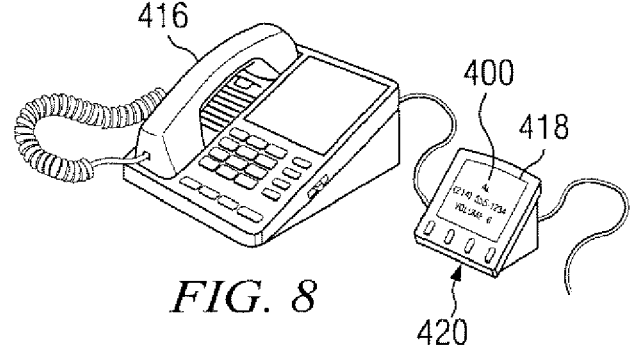
FIG. 8 is an illustration of the present invention box attached to a telephone.
Figure 9:
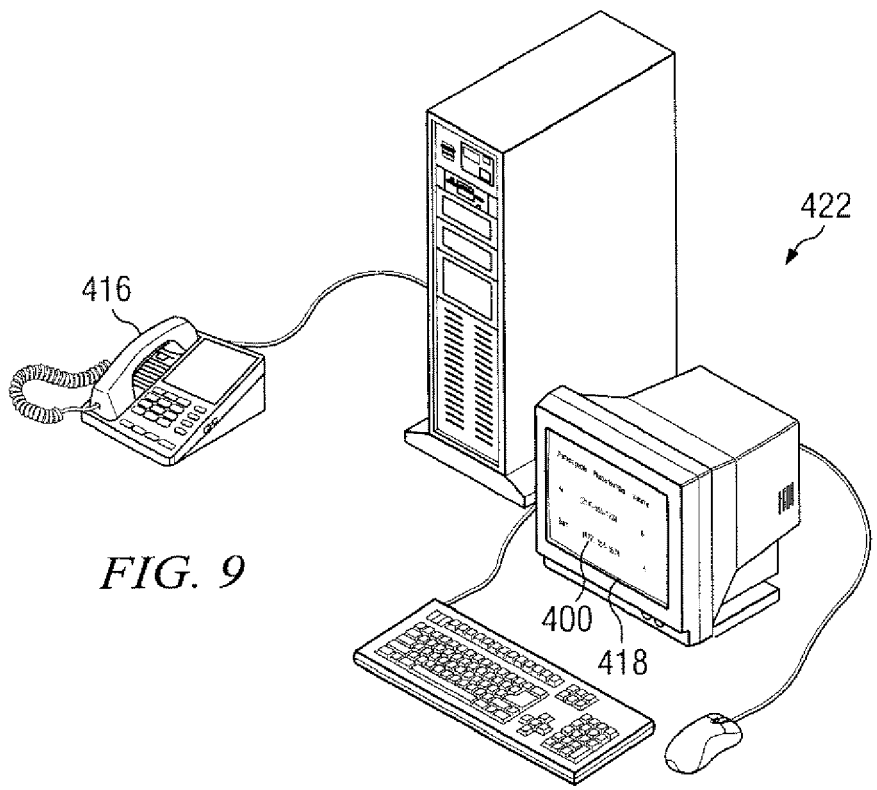
FIG. 9 is an illustration of the present invention installed on a computer connected to a telephone.

FIGS. 7, 8, and 9 are examples of different hardware that may contain the present invention. FIG. 7 is an illustration of telephone 416. Telephone 416 contains a display screen 418, which may display GUI 400. Telephone 416 may also contain navigation buttons. FIG. 8 is an illustration of telephone 416 without a display screen. Telephone 416 is connected to box 420 that contains display screen 418. Display screen 418 may display GUI 400. Either telephone 416 or box 420 may contain navigation buttons. FIG. 9 is an illustration of telephone 416 connected to computer 422. Computer 422 contains display screen 418, which may display GUI 400. Persons of ordinary skill in the art are aware of how to connect a computer to a telephone to display information transmitted over the telephone line.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for equalizing a volume of a conference call, the method comprising the steps of:
   a computer setting the volume of the conference call that a plurality of participants attend;
   the computer adjusting a volume of each one of a plurality of participants to be equal to the volume of the conference call;
   the computer providing, during the conference call, speech of each speaking participant of the plurality of participants to each non-speaking participant of the plurality of participants at the volume of the conference call.

2. The method according to claim 1 further comprising the steps of:
   the computer determining whether a new participant has joined the conference call;
   the computer including the new participant in the plurality of participants in response to the new participant joining the conference call;
   the computer determining whether a user has indicated that a new volume of the new participant is to be adjusted only in response to the new participant joining the conference call;
   responsive to a determination that the user has indicated that the new volume is to be adjusted only in response to the new participant joining the conference call, the computer adjusting the new volume during an interval after the new participant joins the conference call; and
   the computer ceasing the adjusting of the new volume after the expiration of the interval.

3. The method according to claim 1 further comprising the steps of:
   the computer determining whether a user has indicated that the volume of each one of the plurality of participants is to be readjusted in response to an occurrence of an interval;
   responsive to a determination that the user has indicated that the volume of each one of the plurality of participants is to be readjusted in response to the occurrence of the interval, the computer determining if the interval has occurred; and
   after determining that the interval has occurred, the computer readjusting the volume of each one of the plurality of participants to be equal to the volume of the conference call.

4. The method according to claim 1 further comprising the steps of:
   the computer determining whether a user has indicated that the volume of each one of the plurality of participants is to be readjusted continuously; and
   responsive to a determination that the user has indicated that the volume of each one of the plurality of participants is to be readjusted continuously, the computer continuously readjusting the volume of each one of the plurality of participants to be equal to the volume of the conference call.

5. The method according to claim 1 further comprising the steps of:
   the computer displaying a participant name, a participant phone number, and a current participant volume level for each one of the plurality of participants.

6. The method according to claim 1 further comprising the steps of:
   the computer determining if the volume of the conference call has been adjusted to an adjusted volume;

after the computer determines that the volume of the conference call has been adjusted, the computer readjusting the volume of each one of the plurality of participants to be equal to the adjusted volume; and the computer providing, during the conference call, speech of each speaking participant of the plurality of participants to each non-speaking participant of the plurality of participants at the adjusted volume.

7. The method according to claim 1 further comprising the steps of:

the computer adjusting the volume of each one of the plurality of participants individually.

8. The method according to claim 1 further comprising:

during the conference call, the computer resetting the volume of the conference call to a second conference call volume;

the computer adjusting the volume of each one of the plurality of participants to be equal to the second conference call volume; and the computer providing, during the conference call, speech of each speaking participant of the plurality of participants to each non-speaking participant of the plurality of participants at the second conference call volume.

9. A computer system for equalizing a volume of a conference call, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to set the volume of the conference call that a plurality of participants attend;

program instructions, stored on at least one of the one or more storage devices for execution by at least one of the one or more processors via at least one of the one or more memories, to adjust a volume of each one of the plurality of participants to be equal to the volume of the conference call; and program instructions, stored on at least one of the one or more storage devices for execution by at least one of the one or more processors via at least one of the one or more memories, to provide, during the conference call, speech of each speaking participant of the plurality of participants to each non-speaking participant of the plurality of participants at the volume of the conference call.

10. The computer system according to claim 9 further comprising:

program instructions, stored on at least one of the one or more storage devices for execution by at least one of the one or more processors via at least one of the one or more memories, to determine whether a new participant has joined the conference call;

program instructions, stored on at least one of the one or more storage devices for execution by at least one of the one or more processors via at least one of the one or more memories, to include the new participant in the plurality of participants in response to the new participant joining the conference call;

program instructions, stored on at least one of the one or more storage devices for execution by at least one of the one or more processors via at least one of the one or more memories, to determine whether a user has indicated that a new volume of the new participant is to be adjusted only in response to the new participant joining the conference call;

program instructions, stored on at least one of the one or more storage devices for execution by at least one of the one or more processors via at least one of the one or more memories, to, in response to a determination that the user has indicated that the new volume is to be adjusted only in response to the new participant joining the conference call, adjust the new volume during an interval after the new participant joins the conference call; and program instructions, stored on at least one of the one or more storage devices for execution by at least one of the one or more processors via at least one of the one or more memories, to cease adjusting the new volume after the expiration of the interval.

11. The computer system according to claim 9 further comprising:

program instructions, stored on at least one of the one or more storage devices for execution by at least one of the one or more processors via at least one of the one or more memories, to determine whether a user has indicated that the volume of each one of the plurality of participants is to be readjusted in response to an occurrence of an interval;

program instructions, stored on at least one of the one or more storage devices for execution by at least one of the one or more processors via at least one of the one or more memories, to, in response to a determination that the user has indicated that the volume of each one of the plurality of participants is to be readjusted in response to the occurrence of the interval, determine if the interval has occurred; and program instructions, stored on at least one of the one or more storage devices for execution by at least one of the one or more processors via at least one of the one or more memories, to, after determining that the interval has occurred, readjust the volume of each one of the plurality of participants to be equal to the volume of the conference call.

12. The computer system according to claim 9 further comprising:

program instructions, stored on at least one of the one or more storage devices for execution by at least one of the one or more processors via at least one of the one or more memories, to determine whether a user has indicated that the volume of each one of the plurality of participants is to be readjusted continuously; and program instructions, stored on at least one of the one or more storage devices for execution by at least one of the one or more processors via at least one of the one or more memories, to, responsive to a determination that the user has indicated that the volume of each one of the plurality of participants is to be readjusted continuously, continuously readjust the volume of each one of the plurality of participants to be equal to the volume of the conference call.

13. The computer system according to claim 9 further comprising:

program instructions, stored on at least one of the one or more storage devices for execution by at least one of the one or more processors via at least one of the one or more memories, to display a participant name, a participant phone number, and a current participant volume level for each one of the plurality of participants.

14. The computer system according to claim 9 further comprising:

program instructions, stored on at least one of the one or more storage devices for execution by at least one of the one or more processors via at least one of the one or more memories, to determine if the volume of the conference call has been adjusted to an adjusted volume;

program instructions, stored on at least one of the one or more storage devices for execution by at least one of the one or more processors via at least one of the one or more memories, to, after the determining that the volume of the conference call has been adjusted, readjust the volume of each one of the plurality of participants to be equal to the adjusted volume; and program instructions, stored on at least one of the one or more storage devices for execution by at least one of the one or more processors via at least one of the one or more memories, to provide, during the conference call, speech of each speaking participant of the plurality of participants to each non-speaking participant of the plurality of participants at the adjusted volume.

15. The computer system according to claim 9 further comprising:

program instructions, stored on at least one of the one or more storage devices for execution by at least one of the one or more processors via at least one of the one or more memories, to adjust the volume of each one of the plurality of participants individually.

16. The computer system according to claim 9 further comprising:

program instructions, stored on at least one of the one or more storage devices for execution by at least one of the one or more processors via at least one of the one or more memories, to, during the conference call, reset the volume of the conference call to a second conference call volume;

program instructions, stored on at least one of the one or more storage devices for execution by at least one of the one or more processors via at least one of the one or more memories, to adjust the volume of each one of the plurality of participants to be equal to the second conference call volume; and program instructions, stored on at least one of the one or more storage devices for execution by at least one of the one or more processors via at least one of the one or more memories, to provide, during the conference call, speech of each speaking participant of the plurality of participants to each non-speaking participant of the plurality of participants at the second conference call volume.

17. A program product for equalizing a volume of a conference call, the program product comprising:

one or more computer-readable tangible storage devices;

program instructions, stored on at least one of the one or more storage devices, to set the volume of the conference call that a plurality of participants attend;

program instructions, stored on at least one of the one or more storage devices, to adjust a volume of each one of the plurality of participants to be equal to the volume of the conference call; and program instructions, stored on at least one of the one or more storage devices, to provide, during the conference call, speech of each speaking participant of the plurality of participants to each non-speaking participant of the plurality of participants at the volume of the conference call.

18. The program product according to claim 17 further comprising:

program instructions, stored on at least one of the one or more storage devices, to determine whether a new participant has joined the conference call;

program instructions, stored on at least one of the one or more storage devices, to include the new participant in the plurality of participants in response to the new participant joining the conference call;

program instructions, stored on at least one of the one or more storage devices, to determine whether a user has indicated that a new volume of the new participant is to be adjusted only in response to the new participant joining the conference call;

program instructions, stored on at least one of the one or more storage devices, to, in response to a determination that the user has indicated that the new volume is to be adjusted only in response to the new participant joining the conference call, adjust the new volume during an interval after the new participant joins the conference call; and program instructions, stored on at least one of the one or more storage devices, to cease adjusting the new volume after the expiration of the interval.

19. The program product according to claim 17 further comprising:

program instructions, stored on at least one of the one or more storage devices, to determine whether a user has indicated that the volume of each one of the plurality of participants is to be readjusted in response to an occurrence of an interval;

program instructions, stored on at least one of the one or more storage devices, to, in response to a determination that the user has indicated that the volume of each one of the plurality of participants is to be readjusted in response to the occurrence of the interval, determine if the interval has occurred; and program instructions, stored on at least one of the one or more storage devices, to, after determining that the interval has occurred, readjust the volume of each one of the plurality of participants to be equal to the volume of the conference call.

20. The program product according to claim 17 further comprising:

program instructions, stored on at least one of the one or more storage devices, to determine whether a user has indicated that the volume of each one of the plurality of participants is to be readjusted continuously; and program instructions, stored on at least one of the one or more storage devices, to, responsive to a determination that the user has indicated that the volume of each one of the plurality of participants is to be readjusted continuously, continuously readjust the volume of each one of the plurality of participants to be equal to the volume of the conference call.

21. The program product according to claim 17 further comprising:

program instructions, stored on at least one of the one or more storage devices, to display a participant name, a participant phone number, and a current participant volume level for each one of the plurality of participants.

22. The program product according to claim 17 further comprising:

program instructions, stored on at least one of the one or more storage devices, to determine if the volume of the conference call has been adjusted to an adjusted volume;

program instructions, stored on at least one of the one or more storage devices, to, after the determining that the volume of the conference call has been adjusted, readjust the volume of each one of the plurality of participants to be equal to the adjusted volume; and program instructions, stored on at least one of the one or more storage devices, to provide, during the conference call, speech of each speaking participant of the plurality of participants to each non-speaking participant of the plurality of participants at the adjusted volume.

23. The program product according to claim 17 further comprising:
program instructions, stored on at least one of the one or more storage devices, to adjust the volume of each one of the plurality of participants individually.

24. The program product according to claim 17 further comprising:
program instructions, stored on at least one of the one or more storage devices, to, during the conference call, reset the volume of the conference call to a second conference call volume;
program instructions, stored on at least one of the one or more storage devices, to adjust the volume of each one of the plurality of participants to be equal to the second conference call volume; and
program instructions, stored on at least one of the one or more storage devices, to provide, during the conference call, speech of each speaking participant of the plurality of participants to each non-speaking participant of the plurality of participants at the second conference call volume.

* * * * *